May 14, 1968 E. M. BUERMAN 3,383,216
PROCESS FOR BREAKING DOWN SKIN TISSUE OF DOGFISH
Original Filed Aug. 9, 1962
3 Sheets-Sheet 1
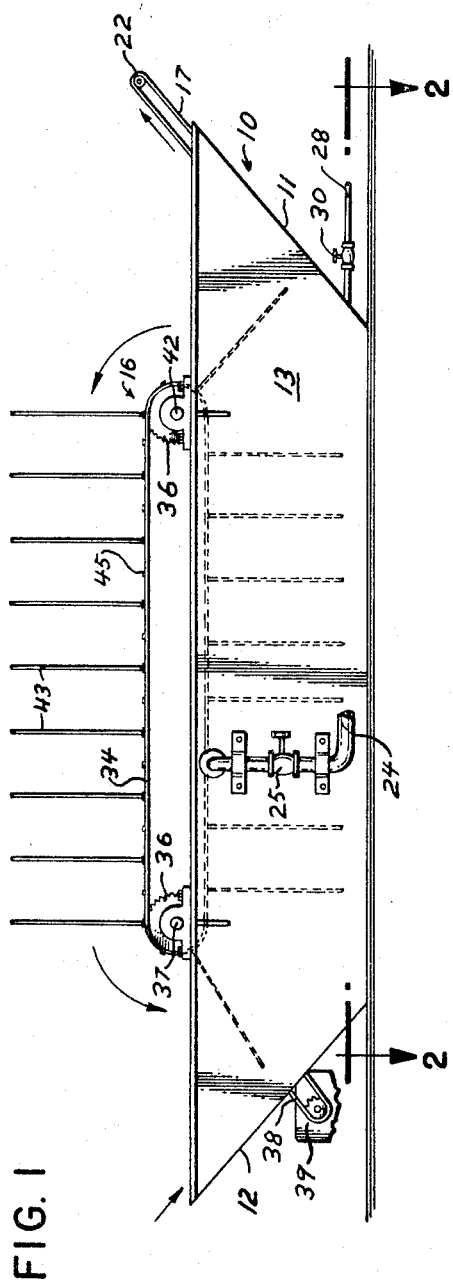
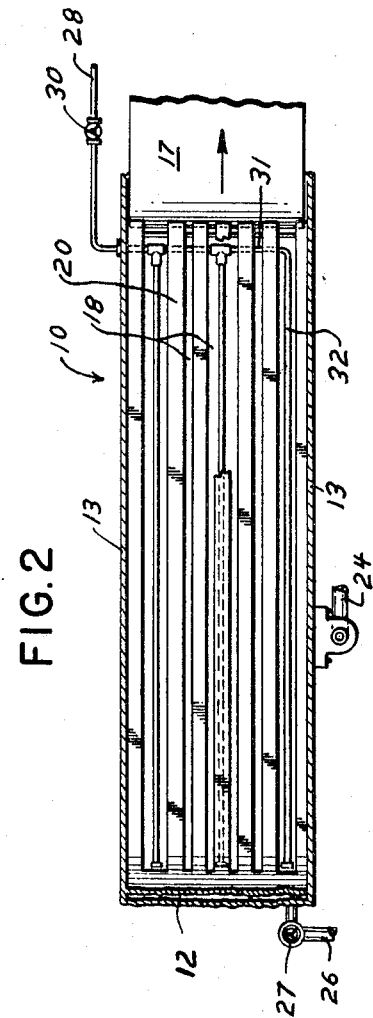
EDWARD M. BUERMAN
INVENTOR.
BY Seed & Berry
ATTORNEYS

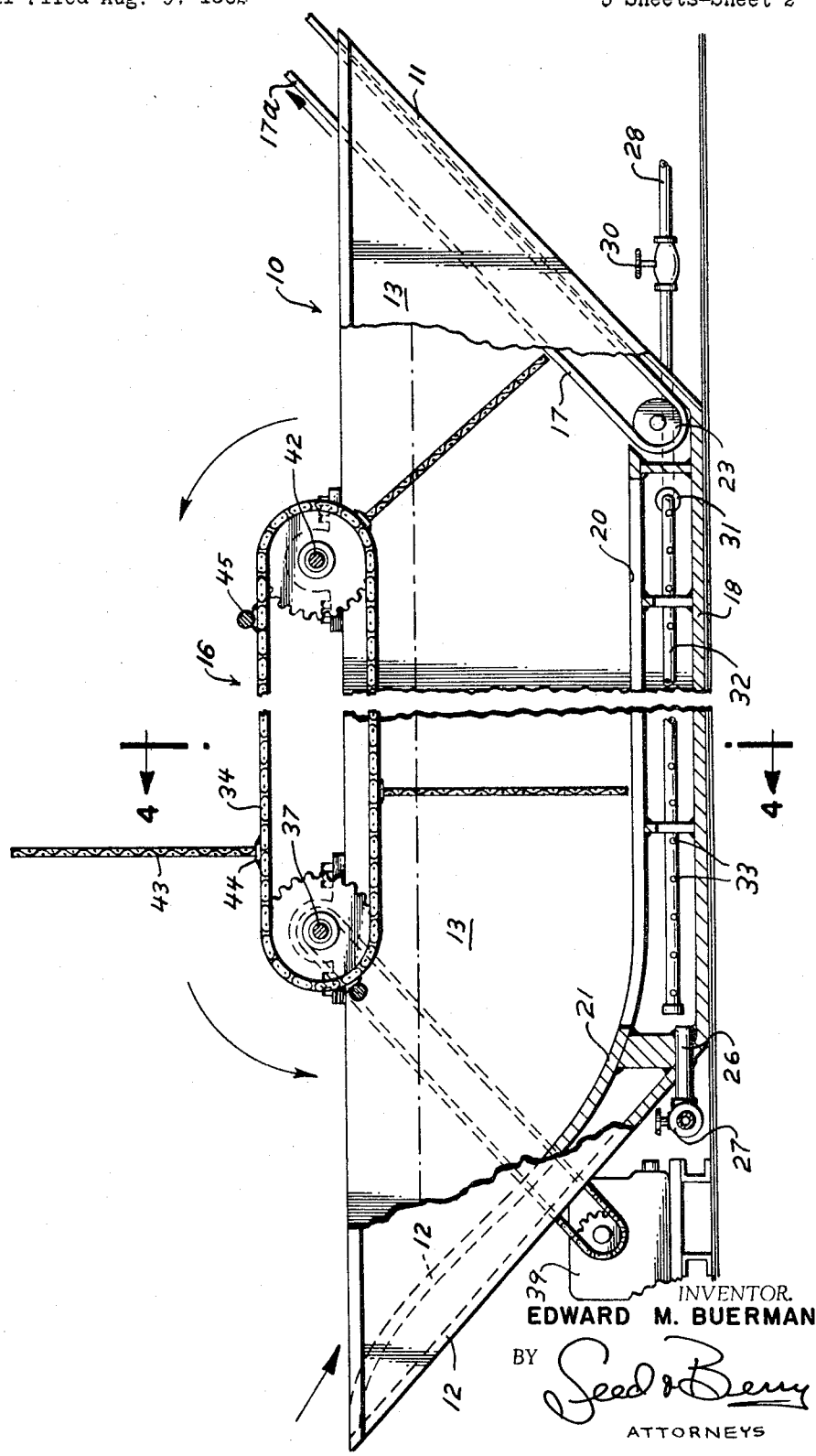

EDWARD M. BUERMAN
INVENTOR.

United States Patent Office 3,383,216
Patented May 14, 1968

3,383,216
PROCESS FOR BREAKING DOWN SKIN TISSUE OF DOGFISH
Edward M. Buerman, Tacoma, Wash., assignor to Buerman Fish Products Co., Astoria, Oreg., a corporation of Oregon
Original application Aug. 9, 1962, Ser. No. 215,969. Divided and this application Dec. 7, 1964, Ser. No. 416,452
2 Claims. (Cl. 99—7)

This invention relates to a method for conditioning the skin portion of dogfish preparatory to the grinding or chopping thereof into a commercially acceptable form and is a division of my copending application, Ser. No. 215,969, filed Aug. 9, 1962, now abandoned.

It is recognized that the class of fish commonly known as "dogfish" have considerable commercial value for use as animal feed, fertilizers, etc. It is generally required, as part of the processing of the fish for these and allied uses, that the fish be ground into small particles. One of the difficulties in grinding the fish is that the skin portion of a dogfish is composed of a very hard substance, consisting mainly of keratin and having a sandpaper-like texture, and being in consequence very damaging to the grinding equipment.

It is a principal object of the invention to provide a method for so conditioning the skin of dogfish that it is practical to grind the fish as part of a commercial process.

The invention has the further object of performing such conditioning in a continuous process.

It is a further object to accomplish the proper conditioning of the skin of the dogfish in a manner to remove the urea therefrom, and without damaging the flesh of the fish.

A yet additional object is to accomplish the foregoing ends in a simple and economical manner so that it is practical to utilize the teachings of the invention on a commercial basis.

Other and more particular objects and advantages, together with the above, will appear and be understood in the course of the following description and claims, the invention consisting in the novel method hereinafter described and claimed.

In the accompanying drawings:

FIGURE 1 is a side elevational view of a processing tank embodying preferred teachings of my invention.

FIG. 2 is a fragmentary horizontal sectional view thereof taken on line 2—2 of FIG. 1.

FIG. 3 is a side elevational view of said tank, with the center portion thereof broken away to expose the operating components contained therein.

Figure 4:
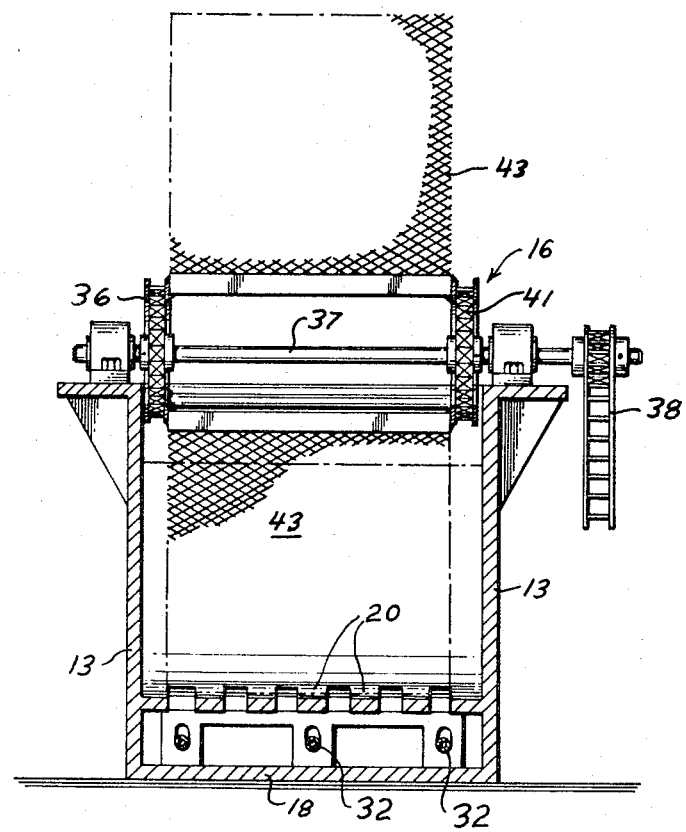
FIG. 4 is a transverse sectional view taken on line 4—4 of FIG. 3.

Referring to the accompanying drawings, illustrating a machine suitable for practicing the process, the numeral 10 designates a processing tank with the front, rear, and side walls thereof being denoted by 11, 12 and 13, respectively. The tank is filled with hot water to the approximate level indicated at 14, and such water is then maintained at a temperature of approximately 180° F. throughout the skin conditioning process. The fish are continuously charged into the tank at the rear end thereof, are carried through the tank at a predetermined rate of progress, and in a predetermined spaced relation with respect to one another, by a conveyor mechanism 16 (to be described hereinafter), and are discharged from the front end of the tank by means of an out-feed belt 17.

To facilitate the ingress or egress of the fish into and from the tank, the rear and front walls 12 and 11 thereof are moderately sloped. The side walls 13 are or may be vertical. Extending longitudinally in a horizontal plane moderately spaced above the floor 18 of the tank are a plurality of closely spaced floor slats 20 along which the fish are moved as they pass through the tank. So that the fish may be most easily fed from the sloping rear wall onto the floor boards 20, the rear wall has its lower end curved, as at 21, to merge with the slats.

The aforementioned outfeed belt 17 is trained over live and idler rollers 22–23, respectively, so as to overlie said front wall 11, with its upper end projecting beyond the forward lip of the tank, and into overlying relation to a pickup conveyor (not shown). While not here illustrated the live roller 22 receives its drive from a motor 39 which also drives the conveyor mechanism 16. Although not shown herein, a supporting table may be provided below the upper run 17a of the out-feed belt 17, so as to hold the same against sag.

The tank is filled through a suitable feed pipe 24, the valve of which is shown at 25. Though there is no continuous flow of water to the tank during the skin conditioning process, it is necessary (for reasons to be discussed hereinafter) that the water in the tank be replaced with fresh water periodically. A pipe 26 with a shut-off valve 27 is provided for such draining purpose.

As the dogfish are carried through the tank by the conveying mechanism 16, steam is introduced from a feed line 28 through a regulating valve 30 into the tank at a location below the floor boards 20. Within the tank, the steam is distributed from a transversely extending manifold 31 into a plurality of horizontal branch lines 32 which extend longitudinally of the tank at equidistantly spaced intervals of the width. Each of these branches 32 is perforated, as at 33, at regular intervals along the length thereof, the water heated by the steam circulating within the tank in a predictable pattern.

The aforementioned conveyor mechanism 16 comprises two longitudinally extending laterally spaced endless chains 34 located above the water level and trained about sets of sprocket wheels 36 and 41. One sprocket wheel of each set is carried by a transversely extending live axle 37 and the other sprocket wheel of each set is carried by a transversely extending free-turning axle 42. The drive is carried from the motor 39 to the live axle 37 by means of a chain 38.

Flights for the conveyor are designated by 43. These flights are rooted to bars 44 which extend transversely of the conveyor chains at equidistant intervals of the length, and cross-rods 45 are or may be provided mid-way between the flight-bars as conveyor-stiffening complements thereof. The flights are comprised of relatively stiff, albeit flexible, rectangular panels of metal or plastic screen, each arranged when free of a resistant load to occupy positions normal to the plane of the conveyor runs and having a length, when hanging pendant from the conveyor's lower run, to extend into proximate but spaced relation to the floor slats 20.

In operation, as the dogfish are fed onto the slideway 21 at the rear of the tank the same are caught by the flight screens 43 and moved by the latter along the length of the slats. The openings in the screen stock, of which the flights are composed, permit water to flow freely from the front to the back sides thereof and permits unhampered circulation without undue disturbance. In their travel with the flights, which partake of a bend under force of loading so as to yieldingly press the fish downwardly in the tank, the fish remain constantly submerged and have substantially their entire surface exposed at all times to the water. While becoming softened and losing their sandpaperish quality in course of the conveyed travel of the fish, the skins remain intact and are not shed which would, perforce, require frequent replacement of the water. Upon reaching the tail end of the grate-like walk-way defined by the slats, the processed fish are deposited upon the out-feed belt and carried thereby to the pick-up conveyor, by which the fish are carried to the grinding machines.

The steam regulating valve 30 is set according to the ambient temperature, the temperature and quantity of fish being processed in the tank, and other related factors so that the water in the tank is maintained at all times very close to 180° F. The rate of travel of the conveying mechanism 16 is regulated so that the total elapsed time during which each fish is immersed in the water of the tank is close to eleven seconds. With these conditions, the skin of the fish becomes sufficiently softened so that the fish can, with relative ease, be then processed through a following grinding operation. Should the fish be held in contact with the 180° water for unduly long periods, say a half minute, skin-shedding takes place and the flesh beneath the skin becomes "cooked" to a degree making the same unpalatable as a feed.

A characteristic of dogfish is that they excrete urea through their skin, with a good portion of the urea contained in the fish being carried in the skin or along the skin line. The skin conditioning process described herein has been found to remove the urea in significant quantities, the urea passing into the water of the tank. Such a lowering of the urea content of the fish has been found highly desirable in conditioning the fish for some of the commercial uses to which dogfish are suited. It has been found that even a very high concentration of urea in the water of the tank does not impede the skin conditioning process of the present invention so that the process can be carried on continuously for extended periods without requiring the water in the tank to be drained and replaced. Should it be desired, a continual "bleed" introduction of fresh water can be provided, while continually draining a corresponding volume from the tank, or small-quantity withdrawal and fill operations can be performed intermittently at moderately short time intervals so that a constant or near-constant water level is maintained.

It is believed that the invention will have been clearly understood from the foregoing detailed description.

What I claim is:

1. A continuous process for conditioning the skin of dogfish to remove a high percentage of the urea content and permit the fish to be put through a subsequent grinding operation and used as food, said process comprising: conveying the fish without interruption along a travel path which includes within its length a water bath maintained at a temperature close to 180° F. and having a depth exceeding the thickness of the fish; subjecting the fish to a gentle downward pressure during its traversal of the bath to cause the fish to be completely submerged; and establishing for the conveyed fish as it traverses said bath (1) a speed sufficiently slow to preclude undue disturbance of the water, and (2) a length of travel so correlated to said speed that the conveyed fish is immersed for a period of approximately eleven seconds.

2. The process of claim 1 in which the manner by which said downward pressure is applied is such as to insure that the water is given direct access to substantially the entire surface of the skin of the fish.

References Cited

UNITED STATES PATENTS

| | | | |
|---|---|---|---|
| 2,787,549 | 4/1957 | Heald | 99—111 |
| 2,996,386 | 8/1961 | Levin | 99—111 |

A. LOUIS MONACELL, *Primary Examiner.*

J. M. HUNTER, *Assistant Examiner.*